(12) United States Patent
Rickard

(10) Patent No.: US 9,825,842 B2
(45) Date of Patent: Nov. 21, 2017

(54) NETWORK TEST SYSTEM

(71) Applicant: BAE Systems Information And Electronic Systems Integration Inc., Nashua, NH (US)

(72) Inventor: Dale A. Rickard, Manassas, VA (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 361 days.

(21) Appl. No.: 14/579,152

(22) Filed: Dec. 22, 2014

(65) Prior Publication Data

US 2015/0180760 A1 Jun. 25, 2015

Related U.S. Application Data

(60) Provisional application No. 61/920,159, filed on Dec. 23, 2013.

(51) Int. Cl.
*H04L 12/26* (2006.01)
*H04L 25/00* (2006.01)

(52) U.S. Cl.
CPC .............. *H04L 43/50* (2013.01); *H04L 25/00* (2013.01)

(58) Field of Classification Search
None
See application file for complete search history.

(56) References Cited

U.S. PATENT DOCUMENTS

| | | | | |
|---|---|---|---|---|
| 7,796,629 | B1* | 9/2010 | MacAdam | H04L 47/10 370/352 |
| 2003/0002505 | A1* | 1/2003 | Hoch | H04J 3/1611 370/392 |
| 2006/0176943 | A1* | 8/2006 | Sindalovsky | G01R 31/31716 375/225 |
| 2008/0247416 | A1* | 10/2008 | Gentieu | H04L 43/18 370/465 |
| 2010/0218058 | A1* | 8/2010 | Somasundaram | G01R 31/31706 714/724 |
| 2010/0235696 | A1* | 9/2010 | Emam | G01R 31/318536 714/727 |

OTHER PUBLICATIONS

Texas Instruments Literature, Multi-core Processor with RapidIO, RapidIO Trade Association 4Q13, 26 pages. Document is undated but was publicly available before Dec. 22, 2014.

* cited by examiner

*Primary Examiner* — Gary Mui
(74) *Attorney, Agent, or Firm* — Sand & Sebolt, LPA

(57) ABSTRACT

A network test system seeks to improve visibility into the real-time operation of a network system or subsystem of a spacecraft through the use of a port from each relevant network to a spacecraft test interface. The network test system includes a packet switch operatively coupled downstream from a SERDES receiver and operatively coupled upstream from a SERDES transmitter. The packet switch in conjunction with the signal replicator in the SERDES receiver taps off a data stream of the network activity so that the port allows an observation device to passively observe the network activity. The system is adapted to increase real-time observation of network activity without disturbing the network.

25 Claims, 10 Drawing Sheets

NETWORK TEST SYSTEM

CROSS-REFERENCE TO RELATED APPLICATION

This application claims priority from U.S. Provisional Application Ser. No. 61/920,159, filed Dec. 23, 2013, the disclosure of which is incorporated herein by reference.

BACKGROUND OF THE INVENTION

Technical Field

The present invention relates to generally observing network activity. More particularly, the present invention relates to integrating a port within a network system to passively observe the network or inject test traffic into a network port. More particularly, the present invention relates to a spacecraft integrated system allowing a user to observe the spacecraft network at a port on a box without effecting network operation or inject test traffic into a network port.

Background Information

Spacecraft are highly technical machines that include highly complicated and detailed electrical networks. The electrical networks control many aspects of spacecraft function, such as communication, environmental homeostasis, and power. Often times the physical circuits and electrical wiring defining these networks are housed in boxes on the spacecraft.

Payloads and other spacecraft subsystems are becoming increasingly more complex and adding extensive high speed networking capabilities. Similarly, satellites and spacecraft themselves are becoming more complex with high speed networks connecting subsystems such as sensors, payloads, processing boxes, communications systems and spacecraft control systems. Many of these networks extend from individual integrated circuits, circuit cards, electronics boxes, and subsystems across the full satellite system and use packet-based communication standards such as RapidIO or Gigabit Ethernet. These communication standards and networks are often based on high speed serializer/deserializer (SERDES) physical layer signaling protocols. Due to spacecraft manufacturing standards and requirements to minimize weight, manage heat dissipation and ensure high reliability, it is extremely time consuming and expensive to open spacecraft boxes or disassemble parts of a spacecraft under construction to investigate an anomaly. The spacecraft integration and test can take more than one year to complete.

Prior art network test systems exist and touch upon observing a network under test. An exemplary prior art network test system depicted in PRIOR ART FIG. 1 which displays a packet switched network that is coupled with network test equipment and the packet switched network traffic flows to the test equipment via the networks native packet switched protocol. A Serializer/Deserializer (SERDES) physical layer communications link using packet switched protocol (Gigabit Ethernet, RapidIO etc.) couples a device with SERDES ports to the packet switched network. The device(s) could be individual integrated circuits, circuit cards or boxes full of circuit cards. Packet switches can reside in multiple boxes and/or in a central packet switch box.

Further, the prior art network test system depicted in PRIOR ART FIG. 1 may include a SERDES receiver and a SERDES transmitter depicted in PRIOR ART FIG. 2. The prior art SERDES receiver includes a receiver/amplifier unit and a clock and data recovery unit. Receiver/Amplifier unit may incorporate equalization in the analog domain producing an analog output or equalization may be partly in the digital domain with feedback from clock and data recovery block. High speed data signal between the receiver/amplifier unit and the clock and data recovery unit may be analog or digital. Similarly, prior art SERDES transmitter includes a data serialization and clock combining unit and a de-emphasis and off-chip driver unit. High speed data signal between the data serialization and clock combining unit and the de-emphasis and off-chip driver unit may be analog or digital.

The prior art network depicted in PRIOR ART FIG. 1 may include various devices as depicted in PRIOR ART FIG. 3. Such devices may include an integrated circuit, a circuit board with components installed, or a box of electronics. If the electronic device function shown in PRIOR ART FIG. 3 is the network packet routing and queuing function, the portion of PRIOR ART FIG. 3 shown in the dashed lines may be a packet switch. A packet switch is one standard function within the network where inserting the test ports is convenient. Prior art systems use dedicated test input ports into SERDES receiver(s) (SERDES Rx) and dedicate test output ports from SERDES transmitter(s) (SERDES Tx) to interface with the test equipment.

In the prior art, packet switches are frequently used in the networks and represent convenient, standard components where the test ports could be inserted into the system. The prior art method of routing copied operational network traffic to a test port required modifying packet routing tables and changes the load on packet queues and operational network. Additionally, the routing of test traffic from external network test equipment through SERDES Rx, the packet routing function and into an operational network traffic output (SERDES Tx) port also requires modifying packet routing tables and changes the load on packet queues and operational network. These two scenarios modify the network behavior (congestion, latency, and throughput) which may hide anomalies or create new (false) anomalies and complicate system test and debug.

As depicted in PRIOR ART FIG. 4, a schematic view of design 600 is provided with a system-on-chip microprocessor including a real time test and debug port 602 using SERDES physical layer signaling, system-on-chip port 602. Port 602 is a traditional microprocessor test and debug port with a function that allows an operator to set watch points and do tracing of activity within the processor chip. The activity is then output through an Aurora protocol block 604. Microprocessor 600 is designed to provide software testing and maintenance observability and control through a high speed serial link on the SERDES. FIG. 4 further provides an example of a microprocessor that would be in a spacecraft or a commercial system. Multiple processors, such as 600, or other ASICs would have test ports at a component edge, a card edge, a box edge, or a spacecraft edge in order to be able to observe them or to send control or test signals back in. More particularly, FIG. 4 depicts a Freescale P5020 as 600. The Aurora protocol based test and debug port 602 is used for testing and debugging software running on the microprocessor—setting watch points and breakpoints in the code, tracing code execution at high speeds, etc. In this example there is no direct capability to monitor the network traffic going on and off chip using the prior art test and debug port 602. The main operational network ports of a conventional Freescale P5020 do not have any special real-time test and debug capability. Test port 602 for software debugging illustrates another type of SERDES test port that can be routed to the system test port. The Aurora protocol used for the test and debug port shown as 602 does not support packet switching as there is no routing information in the protocol.

SUMMARY

Issues continue to exist with the above reference prior art as well as other current spacecraft integration and test procedures. Issues exist with the lack of ability to observe activity occurring across the network without affecting operational network parameters such as loading and latency. Issues also exist with the lack of access to individual network links with test packets designed to aid in isolating and verifying operation of those links while not disturbing other network traffic. With the increased use of digital processing and networking both within payloads and between payloads, visibility into the real-time operation of the various spacecraft subsystems and the overall spacecraft networks is needed to speed normal integration and test procedures and support anomaly resolution with accurate fault observations and isolation to minimize the need to disassemble the spacecraft or individual subsystem boxes. The present invention addresses these and other issues.

In one aspect, an embodiment may provide a network test system comprising: a Serial/Deserializer (SERDES) receiver receiving network activity therethrough; a SERDES transmitter downstream from the SERDES receiver receiving network activity therethrough; a circuit switch operatively coupled downstream from the SERDES receiver and operatively coupled upstream from the SERDES transmitter adapted to tap off a data stream of the network activity; and a port adapted to do one of the following, receive an observation device for passively observing network activity and inject a test signal from a device; wherein the system is adapted to increase real-time observation and test capability for network activity without disturbing the network or portions of the network not under test signal injection.

In another aspect, an embodiment may provide a network test system that seeks to improve visibility into the real-time operation of a network system or subsystem of a spacecraft through the use of a port from each relevant network or network device to a spacecraft test interface. The network test system includes a circuit switch operatively coupled downstream from a SERDES receiver and operatively coupled upstream from a SERDES transmitter. The circuit switch in conjunction with the signal replicator in the SERDES receiver taps off a data stream of the network activity so that the port allows an observation device to passively observe the network activity. The circuit switch in conjunction with the signal selection capability of the SERDES transmitter allows an external test signal to be inserted into a network or network device to test a particular portion of the network. The system is adapted to increase real-time observation of network activity without disturbing the network or portions of the network not under test signal injection.

In another aspect, an embodiment may provide a method for a network test system comprising the steps of: providing a network test system including a data test port at an interface of a network; conducting network activity, wherein the network activity includes link traffic; tapping off one of the following: a digital data stream, an analog stream, and an analog-like stream; and observing network activity at the port passively and without disturbing the link traffic. Additionally, test traffic may be injected into a network port to observe the network behavior or test the operation of particular network components.

In yet another aspect, an embodiment of the present invention may provide a method for a network test system comprising the steps of: providing a network test system including a data test port at an interface of a network; conducting network activity, wherein the network activity includes link traffic; tapping off one of the following: a digital data stream, an analog stream, and an analog-like stream; and injecting test activity at the port without disturbing the link traffic to increase real-time observation and test capability for network activity without disturbing the portions of the network not under test signal injection.

BRIEF DESCRIPTION OF THE SEVERAL VIEWS OF THE DRAWINGS

A sample embodiment of the invention is set forth in the following description, is shown in the drawings and is particularly and distinctly pointed out and set forth in the appended claims. The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
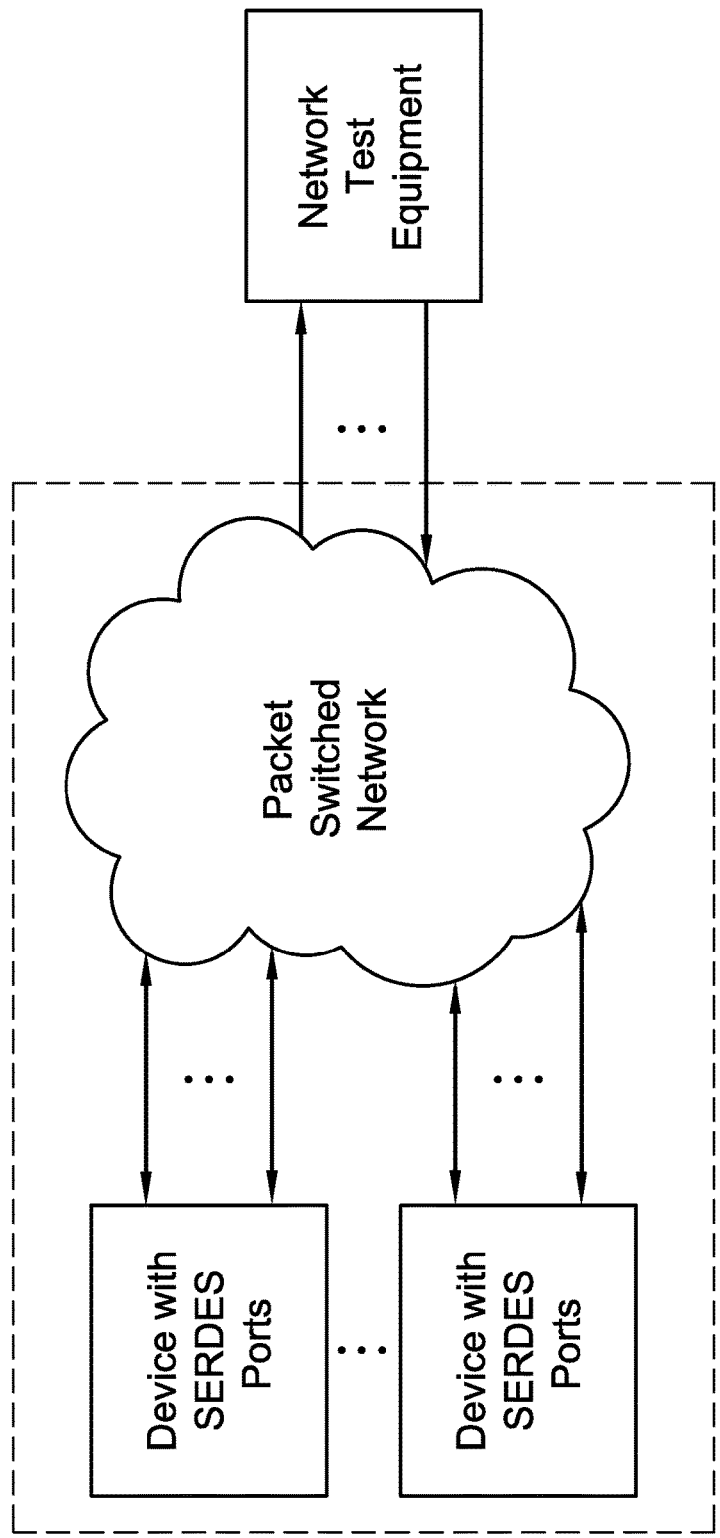
FIG. 1 is a PRIOR ART example of a packet switched network under test.
Figure 2:
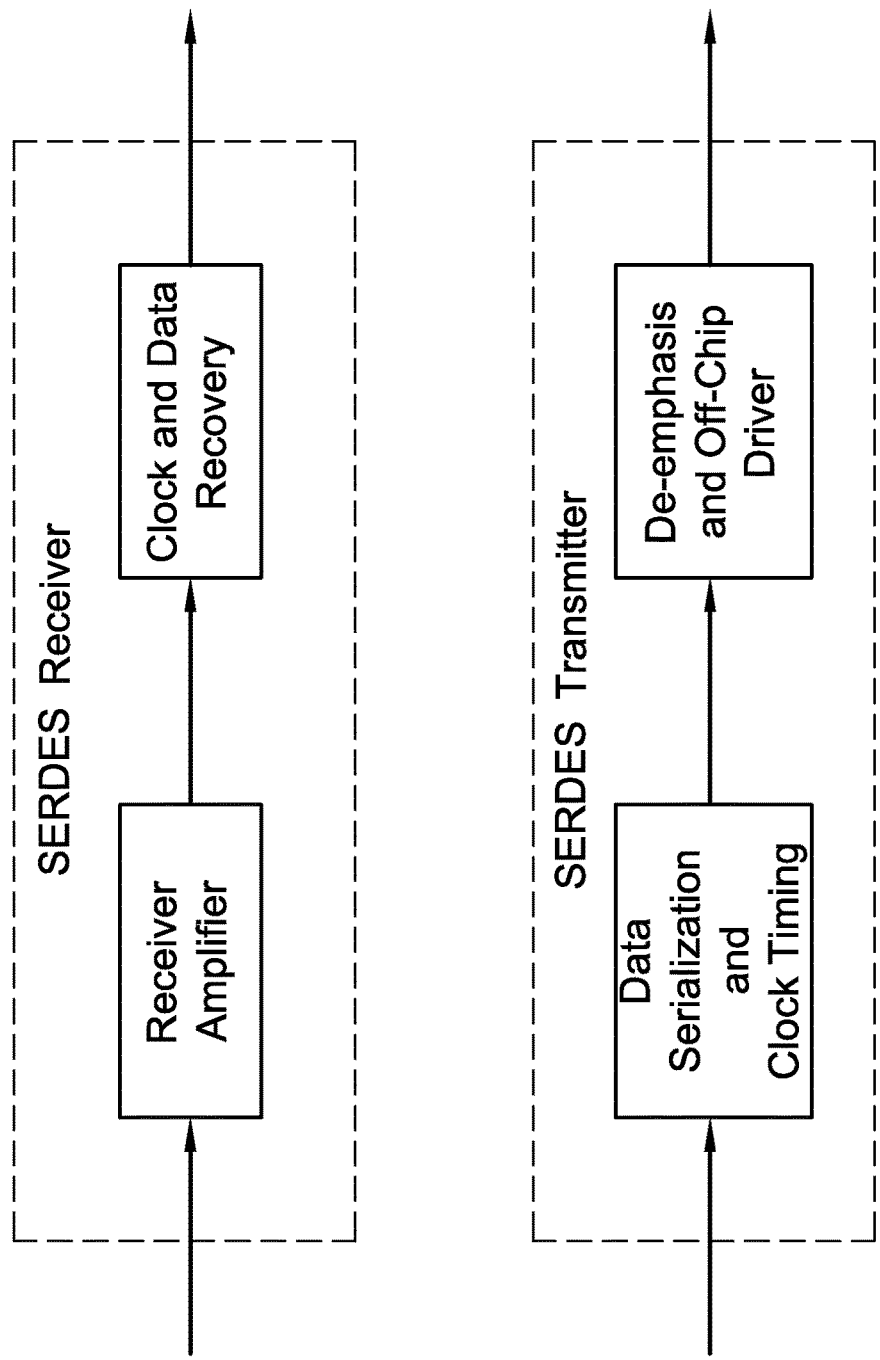
FIG. 2 is a PRIOR ART example of a SERDES receiver and a SERDES transmitter.
Figure 3:
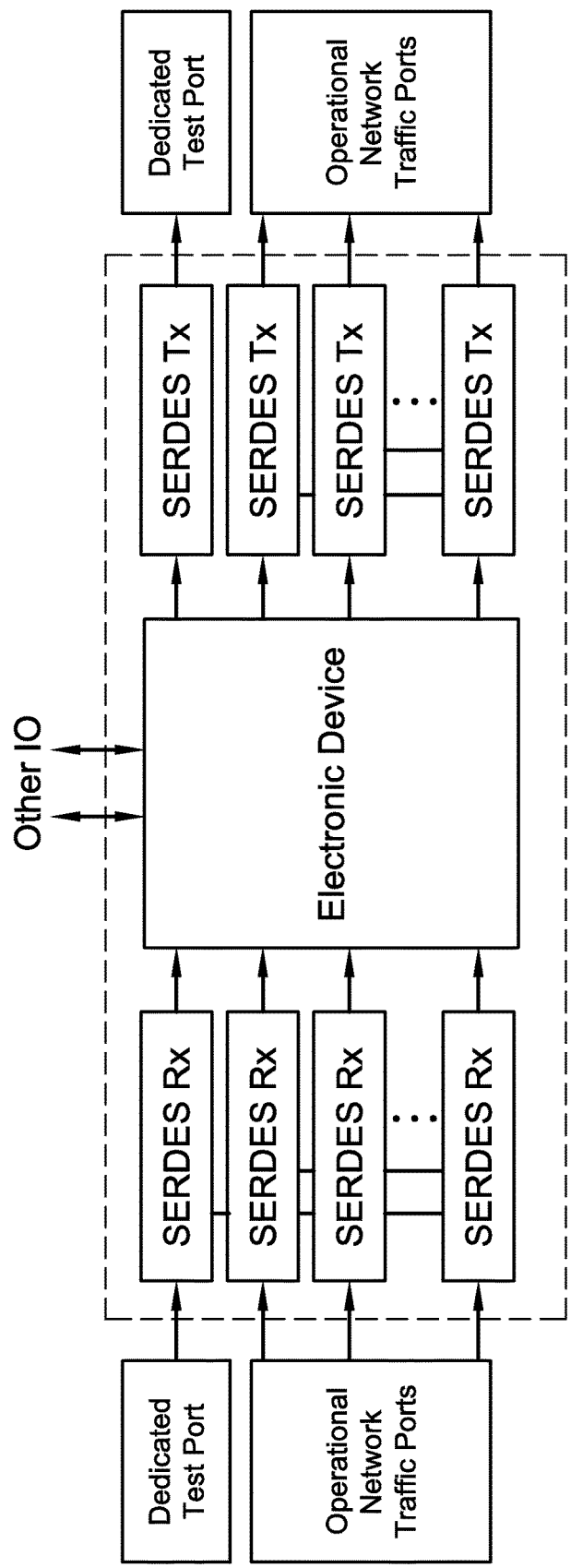
FIG. 3 is a PRIOR ART example of an integrated circuit including SERDES receivers (SERDES Rx) and SERDES transmitters (SERDES Tx) along with dedicated test ports and operational network traffic ports.
Figure 5:
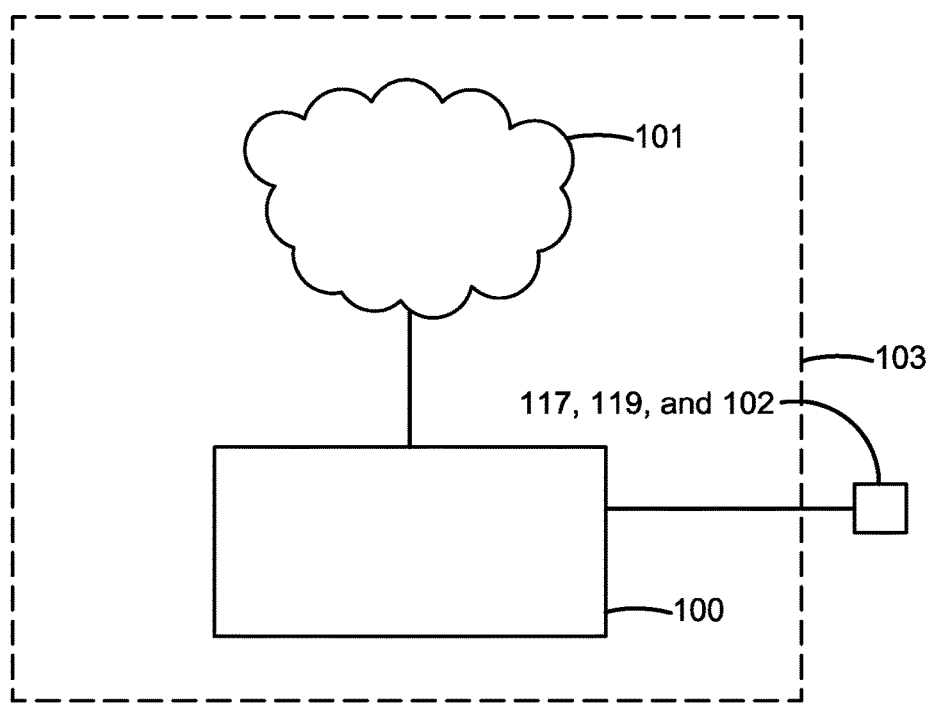
FIG. 5 is a high level environmental diagrammatic of a network test system of the present invention connected to a network in a spacecraft or a spacecraft subsystem.

As depicted by the high-level diagrammatic view of FIG. 5, a network test system of the present invention is depicted as 100 in FIGS. 1-2. Another example of a network test system is depicted as 200 in FIG. 8. Another example of a network test system is depicted as 700 in FIG. 10. The network test system seeks to improve visibility into the real-time operation of a network 101 subsystem or the overall spacecraft 103 by bringing a data port(s) 117, 119 (FIG. 6) from each relevant network 101 to a spacecraft test interface. System 100 may also be referred to herein as Packet Switch 100 when referring to a minimized version of the System when all the components are on an improved packet switch ASIC. System 200 may also be referred to herein as Packet Switch 200 when referring to a minimized version of the System when all the components are on an improved packet switch ASIC.

Figure 6:
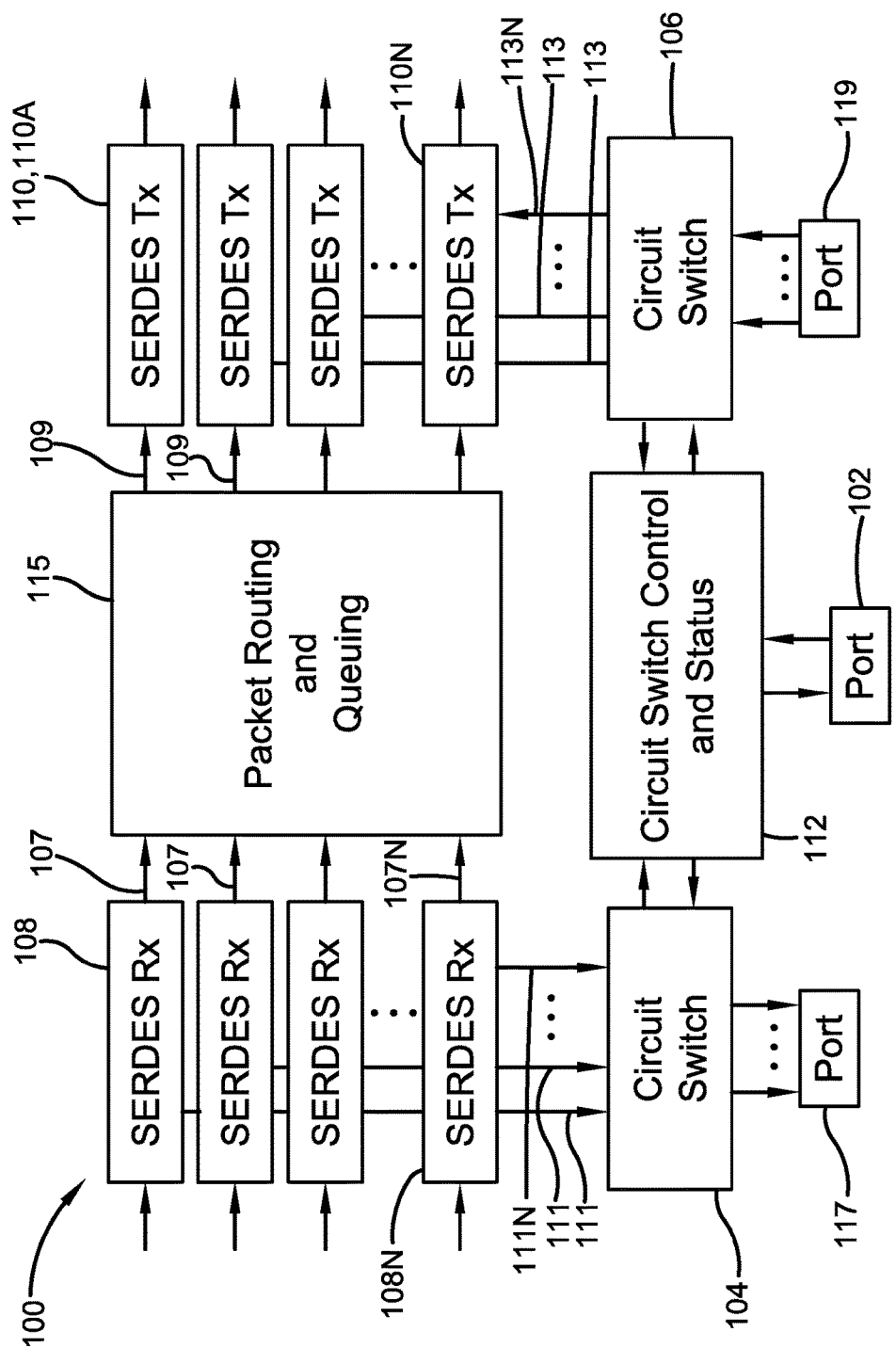
FIG. 6 is a diagrammatic view of the network test system depicting a network packet switch with port replication using a digital or crosspoint type circuit switch.

As depicted in FIG. 6, a spacecraft network test system 100 comprises a low bandwidth control port 102 configured to receive an observation device or a control device, such as a computer, for passively observing network 101 activity or injecting test traffic into selected network links, a first circuit switch 104, a second circuit switch 106, a Serial/Deserializer (SERDES) receiver 108 coupled to the first circuit switch 104, and a SERDES transmitter 110 coupled to the second circuit switch downstream from the SERDES receiver, wherein the system 100 is adapted to increase real-time observation of network 101 activity without disturbing the network. System 100 may be powered independently or powered by spacecraft 103 as one having ordinary skill in the art would understand. Logic 115 is shown as a "Packet Routing and Queuing" whereby System 100 operates as a prior art packet switch augmented with network test capability. Logic 115 could also be any other logic used by the overall system that incorporates SERDES. The circuit switch may be a digital circuit switch or an analog or analog-like crosspoint circuit switch. When System 100 is associated with analog or analog-like link signal selection and/or routing crosspoint type circuit switch is used. First circuit switch 104 and second circuit switch 106 is coupled to a circuit switch control 112. Control 112 operates first and second circuit switch 104, 106. Port 102 is coupled with control 112. A first high speed or high bandwidth data port 117 is coupled with circuit switch 104. A second high speed or high bandwidth data port 119 is coupled with circuit switch 106. High speed ports 117 may observe high bandwidth network activity or port 119 may inject high bandwidth test traffic into selected network links without affecting network behavior for portions of the network not receiving the injected test traffic.

Control port 102 can be a lower bandwidth interface, such as an I²C or SpaceWire or discreet signals, than that of data ports 117 and 119. Control port 102 is configured to control which of the signals 111 from the SERDES receiver 108 are sent to the circuit switch 104 and are then sent to high bandwidth data port 117. Further, control port 102 may be configured to control which signals 113 from data port 119 are inserted into the circuit switch 106 and which SERDES transmitters 110 are configured to inject a signal 113 into the output link. The high speed data ports 117, 119 operate at some multiple (from 1 to N) of the SERDES link rate. Typical link rates are in a range from 1 to 14 Gbps. The control port 102 may operate at a (much) lower effective rate since it is primarily used to set up the circuit switch routing information, control which SERDES receiver(s) 108 have active signal replication 116 (power savings) and to control SERDES transmitter(s) signal selection 122 or MUX(s) 208. Such control information would typically change on a time scale of milliseconds to many seconds so the control interface need not be fast. In one particular example, a relatively simple, convenient, standard interface communicates over the required distance; example interfaces include I2C, USB, RS-422, and SpaceWire.

System 100 also includes a packet switch "Packet Routing and Queuing" function logic 115. In the shown embodiment, packet switch "Packet Routing and Queuing" function logic 115 uses the Serial RapidIO® (SRIO) protocol. System 100 may be implemented as an application-specific integrated circuit (ASIC), a circuit card with components installed, an electronics box or a system of such devices. SRIO packet switch ASIC 100 enables a system-level diagnostic capability using features built into the SERDES on RapidIO ports of packet switch 100. SRIO packet switch ASIC 100 is operatively coupled to receive network traffic through SERDES receivers 108, route traffic to SERDES transmitters 110, route replicated network traffic to port 117 and route network test traffic to SERDES 110. Additionally, there may be a plurality of SERDES receivers 108 and a plurality of SERDES transmitters 110 coupled with packet switch 100, as depicted in FIG. 6. SRIO packet switch ASIC 100 routes data from given inputs to given outputs. A plurality of packet switch 100 inputs 107 are shown along the left side of "Packet Routing and Queuing" function 115, and a plurality of packet switch 100 outputs 109 are shown along the right side of "Packet Routing and Queuing" function 115.

Figure 7:
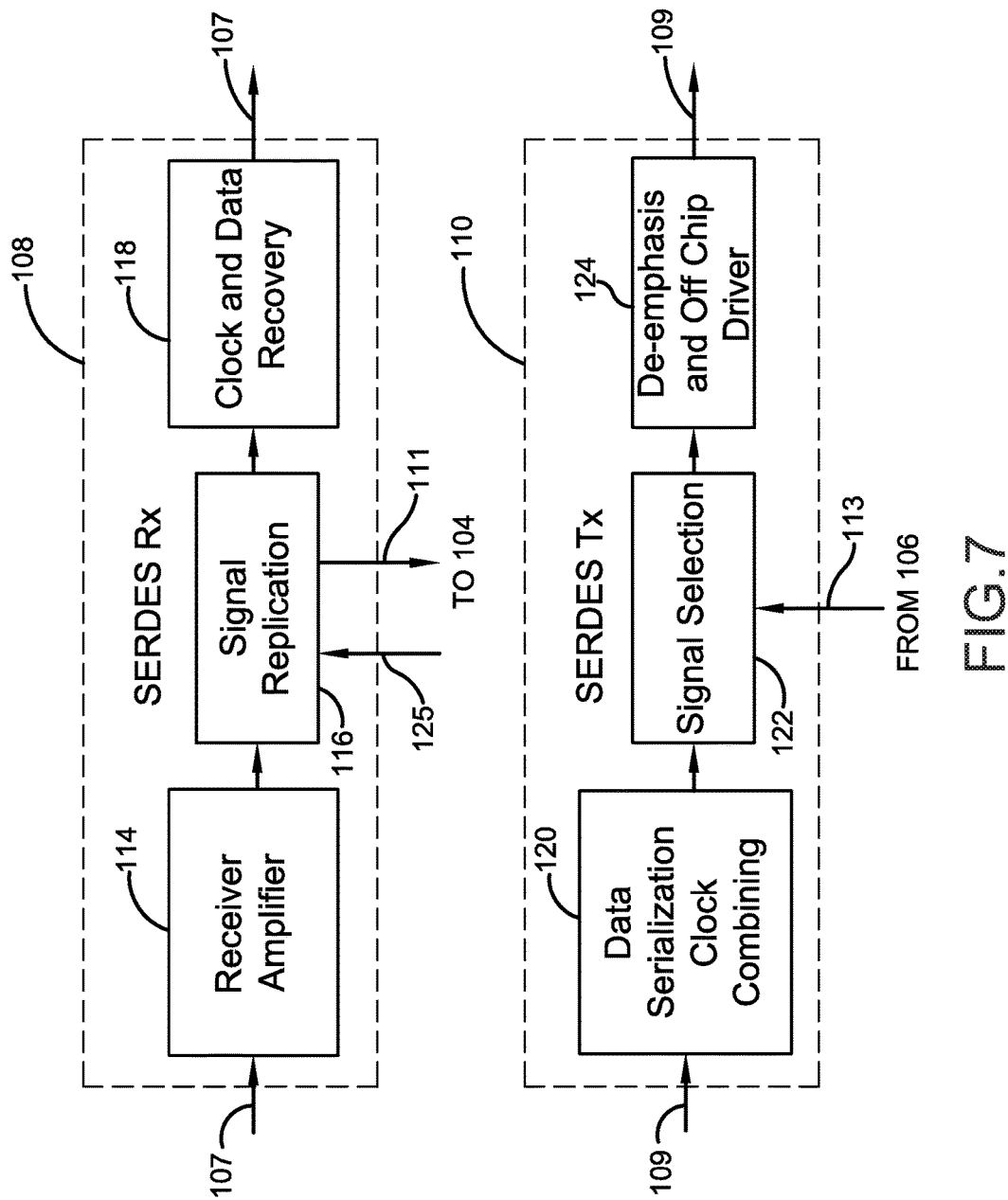
FIG. 7 is a diagrammatic view of a SERDES receiver and a SERDES transmitter with signal replication and signal selection, respectively.

Packet switch 100 may be an integrated circuit, a circuit board with components installed, or a box of electronics. The "Packet Routing and Queuing" function can be replaced with any electronic circuit function and the test port technique of the present invention still applies. Controls can also be routed from the Circuit Switch Control and Status 112 to the SERDES receiver 108 to turn off signal replication when not needed (power savings) and to the SERDES transmitter 110 to control which signal (from data serialization and clock combining unit 120 [FIG. 7] to signal selector 122 [FIG. 7] or the high speed signal 113 [FIG. 7] from the Circuit Switch 106 [FIG. 7]) goes to SERDES Off-Chip Driver 124 (FIG. 7). Only main data paths are shown in and out of each SERDES 108, 110 in FIG. 6.

In one exemplary embodiment of the present invention, intercepting logic or tapping logic is configured to intercept signals going through the SERDES receiver 108 and bring the intercepted signals 111 to circuit switch 104, which is a crosspoint type physical layer circuit switch such that the logic taps off a data stream of network activity. Input or injecting logic is configured to input signals from circuit switch 106 and going into SERDES transmitter 110 as input signal 113. Signal 113 may be repeated as indicated by 113N.

As depicted in FIG. 7, SERDES receiver 108 includes a receiver and equalizer 114, a signal replicator 116, and a clock and data recovery unit 118. Receiver/Amplifier 114 is electrically coupled upstream from signal replicator 116. Signal replicator 116 is electrically coupled upstream from clock and data recovery unit 118. Clock and data recovery unit 118 may also recover data. Prior art SERDES receivers only comprised a receiver and equalizer, and a clock and data recovery unit (SEE FIG. 2). The signal replicator 116 inside SERDES receiver 108 includes signal replication circuit. Signal replication circuit replicates the signal 107 as signal 111. Signal replication circuit routes signal 111 to circuit switch 104. Signal 111 sent from signal replicator 116 is a high speed signal to be routed to the circuit switch 104. A lower speed signal 125 may be provided as an input to the Signal replicator 116 to select whether or not the replicated signal 111 output is active. A crosspoint (analog) circuit switch 104 (FIG. 6) is used with analog signal from Receiver/Amplifier 114 (i.e., the set up depicted in FIG. 6) and a digital circuit switch 204 is used when the Receiver/Amplifier 114 provides a digital signal. When signal replication is not provided by SERDES 108 and signal selection is not supported by SERDES 110 (i.e., only prior art SERDES FIG. 2 is available), the set up depicted in FIG. 8 is used with digital circuit switches 204 and 206.

With continued reference to FIG. 7, SERDES transmitter 110 includes a data serialization and clock combining unit 120, a signal selector 122, and a de-emphasis off chip driver 124. Data serialization and clock combining unit 120 may combine data and is electrically coupled upstream from signal selector 122. Signal selector 122 is electrically coupled upstream from de-emphasis off chip driver 124. Prior art SERDES transmitters only comprised a data serialization and combining clock unit, and a de-emphasis and an off chip driver unit (SEE FIG. 2). The signal selector 122 includes signal selection logic to input signal 113 from circuit switch 106 while simultaneously preventing signal 109 from advancing, until input test signal 113 has provided user with the desired information relating to network 101. Signal selector 122 operates as an analog or digital multiplexer. The signal selector circuit 122 implementation is not within a conventional prior art SERDES transmitter. Signal selector 122 allows the operator to select either the signal 109 from 120 or the signal 113 from second circuit switch 106 to appear at the output of signal selector 122. Signal 113 into signal selector 122 is both a high speed signal to be routed to the Off-Chip Driver 124 and a lower speed signal to select which high-speed signal the Off-Chip Driver 124 receives. If the signal entering into the De-emphasis and Off-Chip Driver circuit 124 is normally analog, a crosspoint (analog) circuit switch 106 is used (i.e., the set up depicted in FIG. 6). If the signal entering into the De-emphasis and Off-Chip Driver circuit 124 is digital, a digital circuit switch 106 is used. The improved SERDES units 108 and 110 shown in FIG. 7 can be used along with a circuit switch on any integrated circuit function, board, etc. to obtain network test capability. The aforementioned packet switch configuration is just one case where the test circuits can be inserted into prior art designs.

Figure 8:
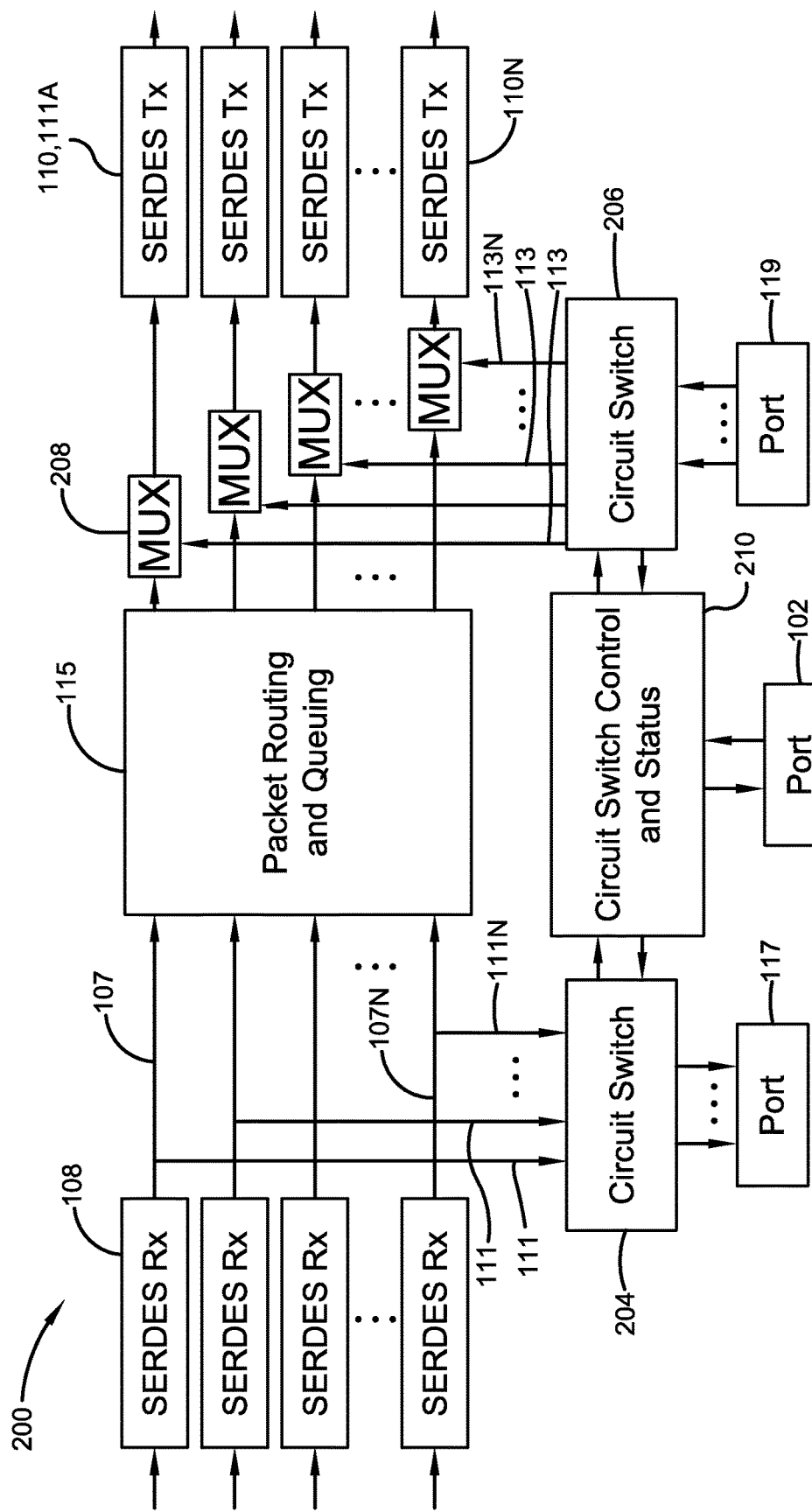
FIG. 8 is a diagrammatic view of the network test system depicting a network switch with port replication using a digital circuit switch.

As depicted in FIG. 8, another embodiment of a network test system 200 comprises the high speed data port 117 configured to receive an observation device, such as a computer, for passively observing network 101 activity, a first circuit switch 204, a second circuit switch 206, a Serial/Deserializer (SERDES) receiver 108 coupled to the first circuit switch 204, a SERDES transmitter 110, a multiplexer 208, and a circuit switch control 210. System 200 is adapted to increase real-time observation of network 101 activities without disturbing the network. System 200 may be powered independently or powered by spacecraft 103 as one having ordinary skill in the art would understand. System 200 is associated with integrated circuit, circuit card with components installed or box of circuit cards where only prior art (FIG. 2) SERDES are available.

In system 200, multiplexer 208 includes two inputs that are electrically coupled to the packet switch 115 and second circuit switch 206. Multiplexer 208 includes an output coupled to SERDES transmitter 110. Multiplexer 208 operatively controls input data streams across the multiplexer to SERDES transmitter 110.

Figure 4:
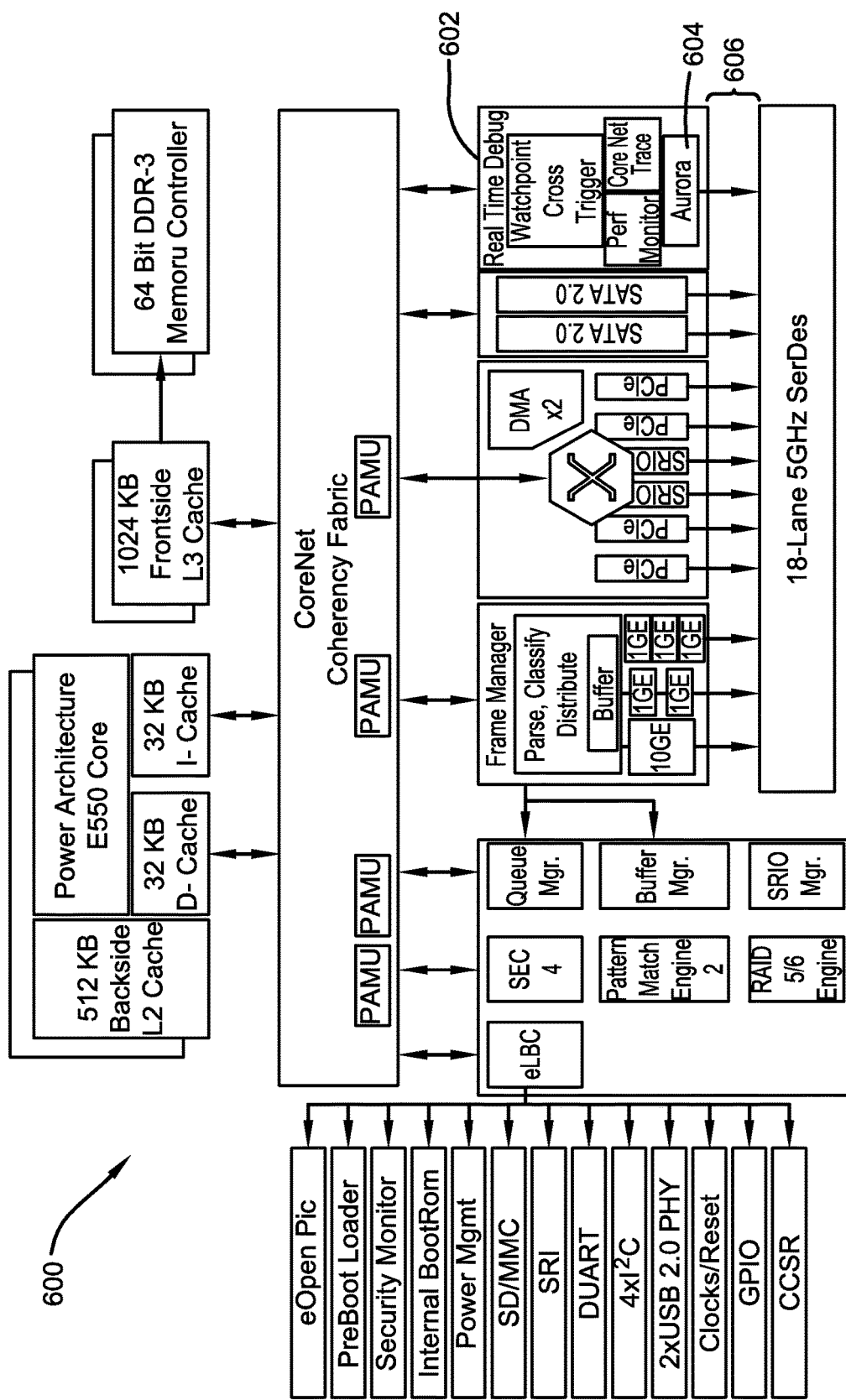
FIG. 4 is a PRIOR ART schematic view of a system-on-chip microprocessor with packet switch network ports (RapidIO and Ethernet) using SERDES and an Aurora protocol over SERDES test and debug port.
Figure 9:
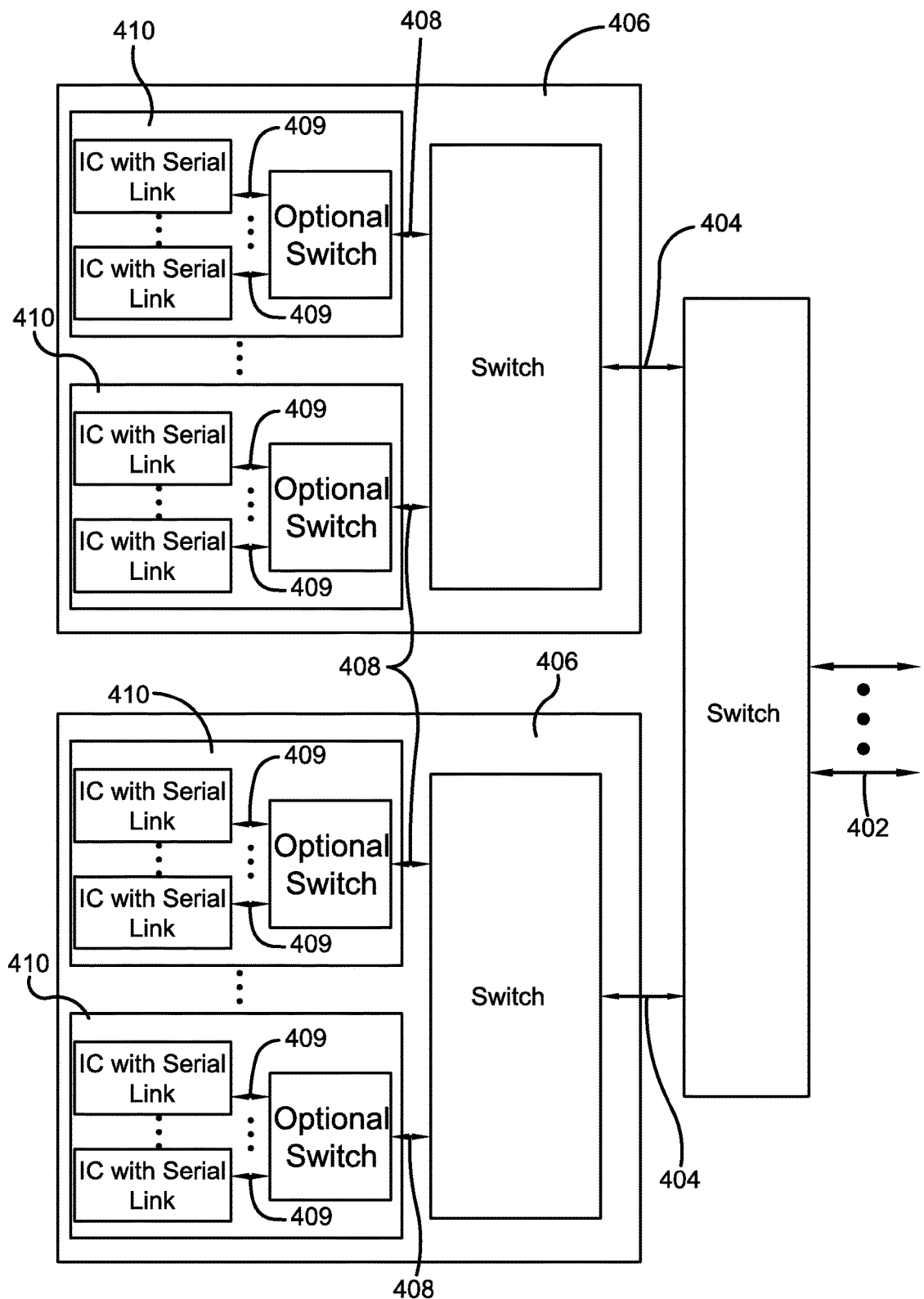
FIG. 9 is a diagrammatic view of an exemplary application of the network test system.

As depicted in FIG. 9, variations of the present invention may include test ports at various levels or layers of the spacecraft. A first test port 402 may be formed in a spacecraft 103 (i.e., at a system level). Additionally, a second test port 404 may be integrally formed with a box 406 (i.e., at a sub-system level). Further additionally, a third test port 408 may be integrally formed on circuit card 410. Further additionally, a fourth test port 409 may be integrally formed at the integrated circuit level. The first, second, third and fourth port 402, 404, 408, 409 operate and permit passive observation in a manner similar to that of data port 117 described herein. Further additionally, the first, second, third test and fourth port 402, 404, 408, 409 operate and permit test signal insertion in a manner similar to that of data port 119 described herein. FIG. 9 depicts how dedicated circuit switches—or packet switches with added circuit switch(es) for test ports—cascade from individual devices through cards, boxes, and a system. Switches may be separate devices or all one device. Both replicated operational network traffic and dedicated test/debug port traffic (e.g. Freescale P5020 shown generally as 600—FIG. 4.) can be routed in/out of the system. Using circuit switch network such as that depicted in FIG. 9 and FIG. 10, the prior art test port 604 (depicted in FIG. 4) may be routed to a spacecraft test port. In fact, multiple such microprocessors and other similar devices may be used in the payloads and all their test ports (one or more at a time) could be routed to the spacecraft test port. A prior art system (FIG. 4) can be improved by inserting the improved SERDES units 108 and 110 of FIG. 7 and the circuit switches 104, 106 of FIG. 6 into future versions of such components to allow direct monitoring of the operational network links (606 in FIG. 4).

Figure 10:
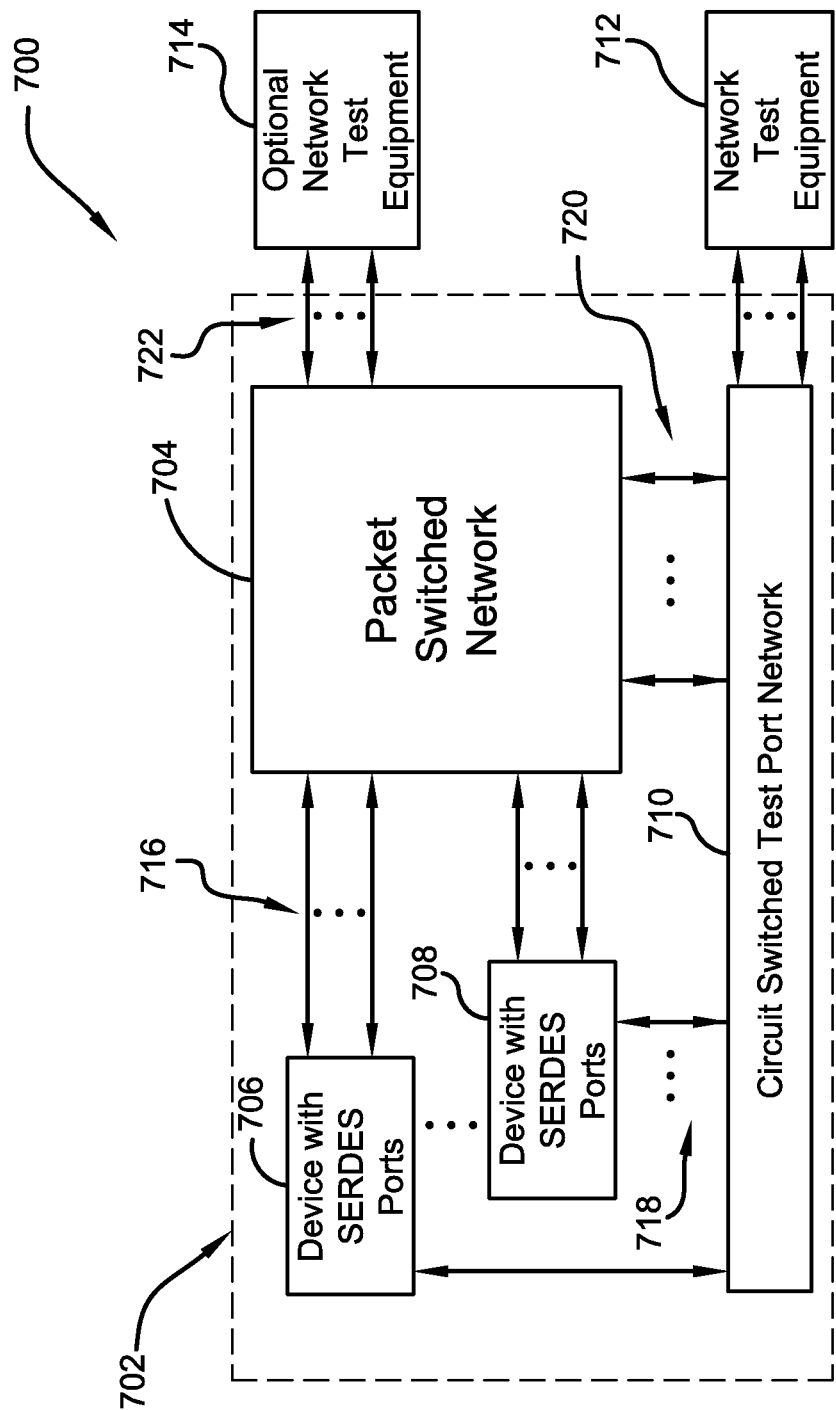
FIG. 10 is a schematic view indicating how test ports are routed at higher levels of boards, box, or satellites.

FIG. 10 depicts a system 700 relating to how test ports are routed at higher levels of boards, box, or satellites. A satellite or system under test boundary is generally indicated at 702. System under test 702 may include a packet switched network 704, a first device 706 with SERDES ports, a second device 708 with SERDES ports, a circuit switched test port network 710, network test equipment 712, optional prior art test equipment 714, SERDES physical layer communications link(s) 718, an packet network link(s) 716, and various controls and one or more SERDES test signals routed in/out of the network devices using embedded circuit switches shown generally at 706, 708, and 720. Packet switched network traffic using selected network protocol may transmit between packet switched network 704 and optional test equipment 714. Packet network links 716 may be accessed via improved SERDES 108, 110 or a digital circuit switch and multiplexer (shown in FIG. 8 where 115 is any generalized function). Existing dedicated Test/Debug SERDES links, such as on a P5020 (shown as 600 in the prior art FIG. 4) can optionally be routed to the test equipment 712 via circuit switch 710. Devices 706, 708 could be individual integrated circuits, circuit cards or boxes full of circuit cards. Packet switches in network 704 can reside in multiple boxes or in a central packet switch box. Circuit switch test port network 710 is similar to network test system 100 for signals from/to enhanced SERDES 108/110 and system 200 for signals from/to prior art SERDES (FIG. 2).

In accordance with an aspect of the present invention, the network test system 100 or 200 observes network activity without modifying the operation of the network. This is useful because data port 117 can passively observe duplicated activity. Whereas in prior art systems, if a test port was treated as a standard port on a typical network, duplicating the link traffic to make it observable on the test port modified the operation of the network. Network test system 100 or 200 is able to bring out test points in order to observe a particular signal within the network 101, without disturbing the normal operation of the network 101. Additionally, Network test system 100 or 200 is able to insert (i.e., inject)

test signals into the network 101 through the port 119 without disturbing the operation of portions of the network not receiving the test signal.

For example, in a prior art network test system, a conventional serial RapidIO packet switch would have to be reprogrammed to add a destination to the link data flow which creates or increases the size of a multi-cast group. This is undesirable inasmuch as this changes switch loading and may change network timing, which could mask (i.e., hide) a timing problem or create new system behavior due to network congestion.

As the complexity of integrated circuits is increasing to the level of systems-on-chip (FIG. 4), high speed test and debug ports are increasingly required. For example in the prior art, Freescale QoIQ system-on-chip multi-core processors (P5020 for example, shown as 600 in FIG. 4) have an integrated test and debug port 602 with SERDES physical link and Aurora link protocol.

As spacecraft subsystems are built with multiple circuit cards holding these and similar integrated circuits with test and debug ports, there is a need to maintain access to one or more of these ports at the box 406 (port 404), subsystem or spacecraft level (port 402) for maintenance, test and debug.

In accordance with another aspect of the current invention, the circuit switch 104, which may be a digital circuit switch or analog crosspoint circuit switch, includes dedicated bandwidth to observe replicated signal 111. This is advantageous because if a system is operating using solely a packet switch, (as is the current state of the art), there must be multiple SERDES Receiver links carrying data packets to be routed to different places (i.e. to different SERDES transmitters 110). Since more than one packet may be destined for a given SERDES transmitter 110 at the same instant, the packet switch must have some queuing mechanism to delay one packet until another has been transmitted. While it is possible in these prior art system to dedicate one input SERDES and one output SERDES channel as a test and maintenance and observation channel, it is extremely burdensome. In this prior art instance, for example, operational network link traffic received through SERDES 108N is to be routed to operational network link through SERDES 110N and replicated within the packet routing and queuing function 115 to SERDES 110A for test port observation. In the prior art, this requires reserving port 110A for test port use causing the loss of that link to operational network traffic and therefor loss of some bandwidth for operational network traffic. In addition to losing bandwidth in the packet switch by not using the present invention (i.e., the current state of the art), when observing a operational network signal that is input into a SERDES receiver 108N and a desired observation point is at the SERDES 110A, that network signal 113 data must be duplicated and the both the operational network signal and the duplicated signal for network monitoring must be routed through the packet switch queues 115 to SERDES transmitter 110A. Prior art systems require the observation data is stored in packet switch queues logic 115 thus creating congestion in the network and the packet switch logic 115. This also modifies the routing through that packet switch logic 115 versus pure observation of the signal 111N through circuit switch 104 and port 117. Thus, to overcome the current state of the art, present invention 100 or 200 adds signal replication and test signal insertion outside the core packet routing and queuing function 115 and does not require any change in the routing or queuing function of 115. Operational network traffic can be observed without altering where data signals are buffered in order to move the data and without impacting the network activity or congestion.

In operation network test system 100 or 200 provides a method for replicating selected link traffic onto the data test port(s) 117 without disturbing the normal operation of the network. Additionally, network test system 100 or 200 includes a method for replicating serial test points from individual integrated circuits or circuit cards and routing them to data test port(s) 117 at the box or subsystem and subsequently the spacecraft level. System 100 or 200 may also provide a method for injecting test traffic through data port 119 without disturbing the normal operation of the network.

In operation, and with reference to system 100 in FIG. 6 and FIG. 7, a crosspoint type circuit switch 104, 106 is used to indicate that analog or analog-like link signal selection and/or routing is used not requiring a clock or other means to synchronize operation with the link. A digital circuit switch is used for digital signal selection and/or routing.

In operation, and with reference to system 200 in FIG. 8, a circuit switch 204, 206 is used to indicate that conventional digital data selection and/or routing is used, normally requiring a clock or other means to synchronize operation with the link.

In operation and with reference to FIG. 6 and FIG. 8, circuit switch 104, 106, 204, 206 and/or crosspoint switch 104, 106 capability is added to selected areas of the spacecraft 103 and spacecraft subsystems to route replicas of selected network link(s) to the subsystem and subsequently the spacecraft 103 level data test ports 117, 119. In one embodiment, a new form of SRIO packet switch ASIC 100/200 is used. The SRIO packet switch 100/200 provides internal circuits that tap off either the digital data stream (for circuit switching in FIG. 8) or the analog or analog-like or digital internal SERDES data stream (for crosspoint or digital circuit switching in FIG. 6) with the ability to select one or more links for replication onto the data test port(s) 117.

Input signals 113 allow an operator to get a signal into system 100. One advantage of this is if a system operator wanted to test the link between the packet switch 100 and some other destination in the network, which might be another packet switch or it might be a processor or an ASIC with a SERDES that is to be tested by inserting controlled test signal. Input signals 113 are routed to one or more of the signal selectors 122 internal to the SERDES 110. SERDES 110 takes this extra input (signal 113) and sends that serial data out as opposed to sending the data (signal 109) from the packet switch routing function 115. This allows the insertion of signal 113 in order to test the link signal 113 is moving through or the device receiving that link traffic.

In operation and with reference to FIG. 7, SERDES transmitter 110 usually takes parallel data of 10 or 20 bits and then serializes that data and transmits it as a series stream. Typical rates are anywhere from one gigabit per second up to 14 gigabits per second (Gbps). The signal from data serialization and clock combining 120 to signal selection 122 may be analog or digital in nature. Signal 113 into signal selection 122 can also be analog or digital in nature where analog crosspoint type circuit switch 106 is typically associated with the analog signals and digital circuit switch 106 is typically associated with the digital signals. The serialized signal moving out of SERDES transmitter 110 is similar to an RF differential signal. The high speed differential signal proceeds in an analog or analog-like format. SERDES receiver 108 is operable to accept signals such as those from SERDES transmitter 110 and usually produces a lower rate parallel data stream of 10 or 20 bits following clock and data recovery 118. Prior to signal 107 being deserialzed, receiver and equalizer 114 amplifies the signal 107. It is amplified because the channel that the signal is transmitting through, such as a cable, would typically have different propagation characteristics for different frequencies that comprise the signal. Receiver/equalizer 114 typically amplifies signal 107 with frequency response equalization. The equalizer of 114 equalizes the gain and phase for different frequencies so that desired portions of the signal can later be recovered. Since signal 107 is a differential signal, it may be amplified, and driven off (i.e., replicated) as a separate signal analog with the signal replicator circuit 116 creating replicated signal 111, and this may repeated as indicated by signal 107N. Signal replicator circuit 116 taps off the serial data stream in SERDES receiver 108 and then handles the serialized data stream as an analog signal. Signal replicator 116 ensures there is enough gain and amplification of the signal to be driven off (i.e., replicated). It is possible that a second amplifier may be operated to create signal 111 and able to drive the signal into 118. In another embodiment, the receiver amplifier 114 includes an analog to digital converter and provides a digital signal to signal replication 116. Signal replicator 116 provides the digital signal to clock and data recovery 118 and replicates the signal to 111 in digital form.

Crosspoint or digital circuit switch 104 then receives the replicated signal 111. In one aspect of the present invention, crosspoint or digital circuit switch 104 is a standalone element that selects the desired signals 111 then drives the signals to test port 117. In reference to FIG. 7, the clock and data recovery 118 takes high speed serial signaling from 116 and converts it to a digital parallel ten bit or twenty bit lower speed digital data exiting SERDES receiver 108 at port 107.

In operation and with reference to FIG. 8, the output of SERDES receiver 108 is a parallel data stream 107 going into packet routing function 115. Circuit switch 204 receives a duplicate of parallel digital data stream 107. In one embodiment, the test port(s) use SERDES as their I/O physical layer. With reference to FIG. 9, fourth test port 409 from individual integrated circuits, third test ports 408 from multiple cards 410 within spacecraft subsystem boxes 406 can optionally be routed to subsystem or box level second test ports 404 and to spacecraft or system level test ports 402 via circuit or crosspoint switch. This includes both routing replicated communications links and providing routing of serial test and debug ports from individual integrated circuits, system-on-chip processors (ex. P5020), and circuit cards. Test signals can similarly be routed from test port 402 to individual network components at any level of the system (i.e., box, card, integrated circuit). Crosspoint switch 104, 106 has the advantage of being protocol agnostic, supporting a wide range of link data rates and not requiring clock and data recovery. The crosspoint switch 104, 106 can readily support multiple protocols and data rates simultaneously and will typically be lower power than a digital circuit switch. Existing jitter cleaning and signal reconstruction logic and circuit techniques can be incorporated into the switch or separate circuits as needed to maintain signal integrity. Nevertheless, digital circuit switch can also be used.

RapidIO protocol network is only one example of a network where this solution applies. The same solution works for gigabit Ethernet and similar networks. The solution can also be applied in other domains including aircraft, ships, military vehicles, commercial data centers, commercial network centers, cell towers, and others. System level test and debug port(s) 402 can be equipped with relevant communications links to provide access to these capabilities even after the spacecraft or other platform is deployed into service.

Those skilled in the art will appreciate that the present invention provides real-time observations of network traffic without modifying the network behavior. It also provides low power circuit or crosspoint switching of replicated test port(s) from individual integrated circuits, circuit cards, boxes, and subsystems to the system (ex. Spacecraft) test port level. It also provides low power circuit or crosspoint switching of individual test and debug ports from individual integrated circuits, system-on-chip, circuit card or subsystem level to box or system level test and debug port(s). It also maintains a consistent and high level of test and debug and network observation capability at all levels of the system throughout the manufacturing cycle at levels from individual integrated circuit through circuit cards, boxes, subsystems and the final system. It also facilitates use of the same test equipment throughout the test and integration from the lowest level to the full system to dramatically reduce cost and schedule. It also provides consistent and high level of test and debug and network observation even after the system is deployed. It also allows insertion of network traffic on selected links for test and debug without disturbing other parts of the network.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), analog functions, an application specific integrated circuit (ASIC), a programmed logic device, a memory device containing instructions, an electric device having a memory, or the like. Logic may include one or more gates, combinations of gates, or other analog or digital circuit components. Logic may also be fully embodied as software. Where multiple logics are described, it may be possible to incorporate the multiple logics into one physical logic. Similarly, where a single logic is described, it may be possible to distribute that single logic between multiple physical logics.

Additionally, although the present invention 100 is detailed for spacecraft, the same or similar problems exist for a wide variety of military and commercial systems including aircraft, ships, data centers, cell towers, and extends to these fields as one having ordinarily skill in the art would understand.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the invention are an example and the invention is not limited to the exact details shown or described.

What is claimed:
1. A network test system comprising:
  a Serial/Deserializer (SERDES) receiver receiving network activity therethrough;
  a SERDES transmitter downstream from the SERDES receiver receiving network activity therethrough;
  a circuit switch operatively coupled to the SERDES receiver and operatively coupled to the SERDES transmitter;

a port operatively coupled to the circuit switch and adapted to receive an observation device or a control device; and a signal replicator including signal replication logic on the SERDES receiver;

wherein the circuit switch is a first digital circuit switch operatively coupled with the signal replicator on the SERDES receiver and coupled with the port; wherein the circuit switch is adapted to tap off a data stream of the network activity to passively observe network activity with the observation device or to inject test traffic into the port from the control device to test a particular portion of the network; and wherein the system is adapted to provide real-time observation and test capability for network activity without disturbing the network or portions of the network not under test signal injection.

2. The network test system of claim 1, wherein the port is a data test port.

3. The network test system of claim 2, wherein the data test port is integrally formed with one of the following: a box of a spacecraft subsystem, a spacecraft system, a circuit card on a spacecraft and an integrated circuit on a spacecraft.

4. The network test system of claim 1, further comprising: the signal selector including signal selector logic on the SERDES transmitter; and a second digital circuit switch operatively coupled with the signal selector on the SERDES transmitter.

5. The network test system of claim 4, further comprising:
a second port coupled with the second digital circuit switch adapted to inject an observation signal into the signal selector downstream from a packet switch to provide real-time observation and test capability for network activity without disturbing the portions of the network not under test signal injection.

6. The network test system of claim 1, further comprising a serial RIO packet switch ASIC.

7. The network test system of claim 1, wherein the port is a SERDES including a physical input/output connection.

8. The network test system of claim 1, in combination with a spacecraft, the combination including:
a box physically connected to the spacecraft and the port connected to the box; and
observation logic configured to releasably attach to the port to observe network activity occurring across the SERDES receiver without effecting network activity.

9. The network test system of claim 1, in combination with a spacecraft, the combination including:
a box physically connected to the spacecraft and the port connected to the box; and
test injection logic configured to releasably attach to the port to inject test point activity into the SERDES transmitter to provide real-time observation and test capability for network activity without disturbing the portions of the network not under test signal injection.

10. A network test system comprising:
a Serial/Deserializer (SERDES) receiver receiving network activity therethrough;
a SERDES transmitter downstream from the SERDES receiver receiving network activity therethrough;
a circuit switch operatively coupled to the SERDES receiver and operatively coupled to the SERDES transmitter;
a port operatively coupled to the circuit switch and adapted to receive an observation device or a control device; and a signal replicator including signal replication logic on the SERDES receiver wherein the circuit switch is a first analog circuit switch operatively coupled with the signal replicator on the SERDES receiver and coupled with the port; wherein the circuit switch is adapted to tap off a data stream of the network activity to passively observe network activity with the observation device or inject test traffic into the port from the control device to test a particular portion of the network; and wherein the system is adapted to provide real-time observation and test capability for network activity without disturbing the network or portions of the network not under test signal injection.

11. The network test system of claim 10, further comprising:
a signal selector including signal selector logic on the SERDES transmitter; and
a second analog circuit switch operatively coupled with the signal selector on the SERDES transmitter.

12. The network test system of claim 11, further comprising:
a second port coupled with the second analog circuit switch adapted to inject an observation signal into the signal selector downstream from a packet switch to provide real-time observation and test capability for network activity without disturbing the portions of the network not under test signal injection.

13. A network test system comprising:
a Serial/Deserializer (SERDES) receiver receiving network activity therethrough;
a SERDES transmitter downstream from the SERDES receiver receiving network activity therethrough;
a circuit switch operatively coupled to the SERDES receiver and operatively coupled to the SERDES transmitter; wherein the circuit switch is a first digital circuit switch operatively coupled with an output of the SERDES receiver receiving a replicated signal;
a port operatively coupled to the circuit switch and adapted to receive an observation device or a control device;
wherein the circuit switch is adapted to tap off a data stream of the network activity to passively observe network activity with the observation device or inject test traffic into the port from the control device to test a particular portion of the network; and
wherein the system is adapted to provide real-time observation and test capability for network activity without disturbing the network or portions of the network not under test signal injection.

14. The network test system of claim 13, further comprising:
a second port; and
a second digital circuit switch operatively coupled with the SERDES transmitter and the second port, the second circuit switch configured to input an observation signal to the SERDES transmitter.

15. The network test system of claim 14, further comprising:
a multiplexer including first and second inputs and an output, wherein the first input is coupled to a packet switch, the second input is coupled with the second digital circuit switch, and the output is coupled with the SERDES transmitter.

16. A network test system comprising:
a Serial/Deserializer (SERDES) receiver receiving network activity therethrough;

a SERDES transmitter downstream from the SERDES receiver receiving network activity therethrough;

a circuit switch operatively coupled to the SERDES receiver and operatively coupled to the SERDES transmitter;

a port operatively coupled to the circuit switch and adapted to receive an observation device or a control device;

wherein the circuit switch is adapted to tap off a data stream of the network activity to passively observe network activity with the observation device or inject test traffic into the port from the control device to test a particular portion of the network;

wherein the system is adapted to provide real-time observation and test capability for network activity without disturbing the network or portions of the network not under test signal injection; and tapping logic configured to tap off a link internal to a packet switch operatively coupled downstream from the SERDES receiver and upstream from the SERDES transmitter such that the normal operation of the packet switch is observable in real-time at the port without interrupting and modifying network activity.

17. A network test system comprising:

a Serial/Deserializer (SERDES) receiver receiving network activity therethrough;

a SERDES transmitter downstream from the SERDES receiver receiving network activity therethrough;

a circuit switch operatively coupled to the SERDES receiver and operatively coupled to the SERDES transmitter;

a port operatively coupled to the circuit switch and adapted to receive an observation device or a control device;

wherein the circuit switch is adapted to tap off a data stream of the network activity to passively observe network activity with the observation device or inject test traffic into the port from the control device to test a particular portion of the network; and wherein the system is adapted to provide real-time observation and test capability for network activity without disturbing the network or portions of the network not under test signal injection; and routing logic configured to sending replicated serial test points from upstream and downstream from a packet switch to the port.

18. A method for a network test system comprising the steps of:

providing a network test system including a data test port at an interface of a network;

conducting network activity, wherein the network activity includes link traffic;

tapping off one of the following: a digital data stream, an analog stream, or an analog-like stream;

observing network activity at the data test port without disturbing the link traffic to provide real-time observation and test capability for network activity without disturbing the network; and wherein the port is integrally formed with one of the following: a box of a spacecraft subsystem, a spacecraft system, a circuit card on a spacecraft, or an integrated circuit, and wherein the port is a test port or a debug port, and replicating selected link traffic onto the port without disturbing network activity.

19. The method of claim 18, further comprising steps of:

amplifying a network signal in the SERDES receiver;

replicating the amplified network signal with a signal replicator including signal replicating logic to create a replicated signal;

sending the replicated signal to a circuit switch; and observing the replicated signal through the port coupled to the circuit switch.

20. The method of claim 18, further comprising steps of:

receiving in the SERDES transmitter a test observation signal from a circuit switch, wherein the circuit switch is coupled with a signal selector including signal selection logic; and determining via signal selection logic whether to output from the SERDES transmitter the network link traffic or the test observation signal.

21. The method of claim 18, further comprising a step of:

injecting test activity at the port without disturbing the link traffic to provide real-time observation and test capability for network activity without disturbing the portions of the network not under test signal injection.

22. A network test system comprising:

a Serial/Deserializer (SERDES) receiver receiving network activity therethrough including a signal replicator between a receiver and amplifier unit and clock and data recovery unit; and a SERDES transmitter downstream from the SERDES receiver receiving network activity therethrough including a signal selector between a data serialization and clock combining unit and a de-emphasis and off chip driver unit.

23. The network test system of claim 22, further comprising:

a replicated signal from the signal replicator received by a circuit switch.

24. The network test system of claim 22, further comprising:

an injected test signal from a circuit switch received by the signal selector.

25. The network test system of claim 22, in combination with a spacecraft, the combination including:

a box physically connected to the spacecraft and a port connected to the box, wherein the port is in communication with the signal replicator or the signal selector through a circuit switch.

* * * * *